(12) United States Patent
Feigin et al.

(10) Patent No.: US 7,255,907 B2
(45) Date of Patent: Aug. 14, 2007

(54) MAGNESIUM OXIDE-BASED CONSTRUCTION BOARD

(75) Inventors: Michael E. Feigin, 7 Tealbriar Cir., The Woodlands, TX (US) 77381; Tak Sing Choi, Huiyang (CN)

(73) Assignee: Michael E. Feigin, The Woodlands, TX (US)

(*) Notice: Subject to any disclaimer, the term of this patent is extended or adjusted under 35 U.S.C. 154(b) by 0 days.

(21) Appl. No.: 11/047,497

(22) Filed: Jan. 31, 2005

(65) Prior Publication Data
US 2006/0172110 A1 Aug. 3, 2006

(51) Int. Cl.
*B32B 13/02* (2006.01)
*B32B 13/04* (2006.01)
(52) U.S. Cl. ........................ 428/70; 428/703
(58) Field of Classification Search .................. None
See application file for complete search history.

(56) References Cited

U.S. PATENT DOCUMENTS

| | | | |
|---|---|---|---|
| 53,092 A | 3/1866 | Sorel | |
| 100,945 A | 3/1870 | Sorel | |
| 1,372,118 A | 3/1921 | Collier | |
| 1,386,914 A | 8/1921 | Tufts | |
| 1,500,207 A | 7/1924 | Shaw | |
| 1,965,538 A | 7/1934 | Stewart | |
| 2,205,735 A | 6/1940 | Scherer, Jr. | |
| 2,543,959 A | 3/1951 | Eastin | |
| 2,598,980 A | 6/1952 | Denning | |
| 2,598,981 A | 6/1952 | Denning | |
| 2,717,841 A | 9/1955 | Biefeld et al. | |
| 2,724,655 A | 11/1955 | Williams | |
| 2,858,227 A * | 10/1958 | Rodsky | ......... 106/698 |
| 2,999,759 A | 9/1961 | Heuer | |
| 3,050,427 A | 8/1962 | Slayter et al. | |
| 3,130,174 A | 4/1964 | Lloyd et al. | |

(Continued)

FOREIGN PATENT DOCUMENTS

CN 1262171 8/2000

(Continued)

OTHER PUBLICATIONS

New Riverside Dictionary, The Riverside Publishing Company, p. 185 (1994).*

*Primary Examiner*—Jennifer McNeil
*Assistant Examiner*—Timothy M. Speer
(74) *Attorney, Agent, or Firm*—Haynes and Boone LLP

(57) ABSTRACT

A construction board is formed from a composition comprising one or more of the following ingredients: magnesium oxide, magnesium chloride, a binding agent (e.g., perlite), wood shavings, recycled board scraps, and water. The construction board further includes fiberglass and polyester paper sheets on opposite sides of the construction board. A method of fabricating the construction board is also disclosed to include mixing magnesium chloride with water to form a solution, mixing the solution with magnesium oxide, perlite and a binding agent to form a paste, and pouring the paste onto a mold to form a construction board. The paste is poured onto a mold which is then passed through a series of rollers to spread out the paste evenly across the mold and to form the paste into the desired thickness. The resulting construction board is fire and water resistant and much more durable than conventional sheetrock.

15 Claims, 5 Drawing Sheets

U.S. PATENT DOCUMENTS

| | | |
|---|---|---|
| 3,133,830 A | 5/1964 | Jochinke |
| 3,147,177 A | 9/1964 | Owens et al. |
| 3,211,675 A | 10/1965 | Johnson |
| 3,238,155 A | 3/1966 | Harrell et al. |
| 3,317,442 A | 5/1967 | Clarke |
| 3,354,099 A | 11/1967 | Stegeman |
| 3,502,610 A | 3/1970 | Thompson |
| 3,573,941 A | 4/1971 | Edwards et al. |
| 3,607,797 A | 9/1971 | Rubens et al. |
| 3,667,978 A | 6/1972 | Vassilevsky et al. |
| 3,751,275 A | 8/1973 | Oken |
| 3,763,070 A | 10/1973 | Shearing |
| 3,778,304 A | 12/1973 | Thompson |
| 4,448,639 A | 5/1984 | Long |
| 4,673,697 A * | 6/1987 | Rowley ..................... 523/218 |
| 4,872,912 A | 10/1989 | Barrall et al. |
| 5,039,454 A * | 8/1991 | Policastro et al. .......... 252/610 |
| 5,049,197 A | 9/1991 | Brown |
| 5,130,184 A * | 7/1992 | Ellis .......................... 442/295 |
| 5,766,337 A | 6/1998 | Moon |
| 6,054,088 A | 4/2000 | Alhamad |
| 6,319,579 B1 * | 11/2001 | Strandgaard ................. 428/45 |
| 6,663,979 B2 | 12/2003 | Deodhar et al. |
| 6,773,794 B2 | 8/2004 | Lindner |
| 2005/0103235 A1 | 5/2005 | Harrison |
| 2005/0252419 A1 | 11/2005 | Mabey |
| 2006/0070321 A1 * | 4/2006 | Au ............................. 52/232 |

FOREIGN PATENT DOCUMENTS

| | | | |
|---|---|---|---|
| CN | 1415574 | | 5/2003 |
| CN | 1450017 | | 10/2003 |
| CN | 1456528 | | 11/2003 |
| EA | 0001799 | | 8/2001 |
| EP | 0475302 | | 8/1994 |
| GB | 1188140 | * | 4/1970 |
| JP | 058029648 A | | 2/1983 |
| JP | 04292449 A | | 10/1992 |
| JP | 10279344 A | | 10/1998 |
| WO | WO 9405737 | | 3/1994 |
| WO | WO 9837032 | | 8/1998 |

* cited by examiner

MAGNESIUM OXIDE-BASED CONSTRUCTION BOARD

BACKGROUND

Homes and other types of structures are fabricated from a variety of materials. Typical materials include, for example, gypsum wallboard and silicate-based products. Conventional gypsum wallboard, while generally satisfactory for its intended use, unfortunately can be easily permanently damaged from water, fire, or blunt force (e.g., a chair knocking into the wall). Also, it has been reported that products that contain silicate in some situations may be harmful to humans. Accordingly, special precautions must be taken to minimize the harmful effects to construction workers that work with silicate-based products.

SUMMARY

In accordance with a preferred embodiment of the invention, a construction board is formed from a composition comprising one or more of the following ingredients: magnesium oxide, magnesium chloride, a binding agent (e.g., perlite), wood shavings, recycled board scraps, and water. The construction board also includes fiberglass and polypropylene sheets on opposite sides of the construction board.

A method of fabricating the construction board is also disclosed herein. The disclosed method comprises mixing magnesium chloride with water to form a solution, mixing the solution with magnesium oxide, perlite and a binding agent to form a paste, and pouring the paste onto a mold to form the construction board. The paste is poured onto a mold and the mold is passed through a series of rollers to spread out the paste evenly across the mold and to form the paste into the desired thickness. The method may also include incorporating fiberglass and/or polyester paper sheets into the board.

The construction board may be used in a variety of applications such as interior wall board, structural sheathing, soffit board, exterior siding, fascia board, tile backer board, decking for countertops, radiant barrier sheathing, structural wrap, stucco wrap, window wrap, ceiling tile, and billboard backer. The resulting construction board advantageously is generally fire resistant, water resistant, and more durable than conventional gypsum wallboard and other types of building materials. Further, because no, or substantially no, silicate is used in the construction board, the potentially harmful effects of silicate-based products are avoided.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular components. As one skilled in the art will appreciate, companies may refer to a component by different names. This document does not intend to distinguish between components that differ in name but not function. Further, in the following discussion and in the claims, the terms "including" and "comprising" are used in an open-ended fashion, and thus should be interpreted to mean "including, but not limited to. . . . " All numerical values in this disclosures are exact or approximate. Accordingly, various embodiments of the invention may deviate from the exact numbers disclosed herein.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
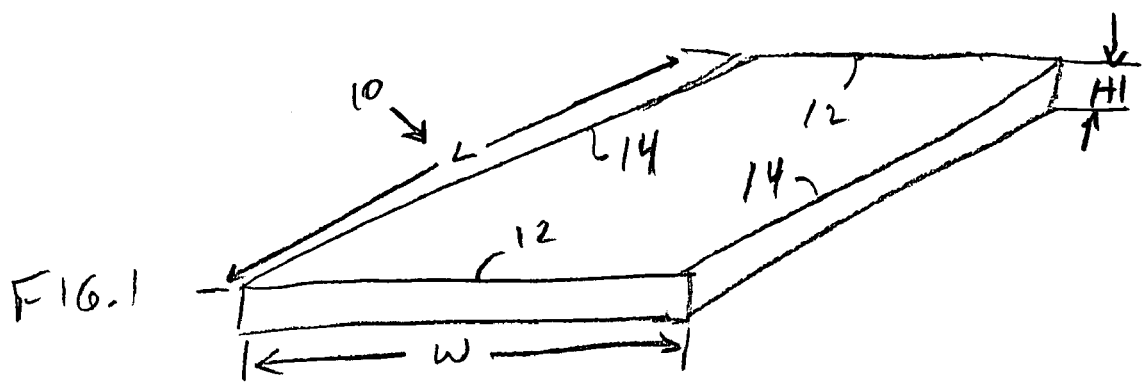
FIG. 1 shows a perspective view of a construction board fabricated in accordance with the preferred embodiment of the invention.

FIG. 1 shows a construction board 10 fabricated in accordance with a preferred embodiment of the invention. The construction board 10 is made from a composition comprising one or more of the following ingredients: magnesium oxide, magnesium chloride, a binding agent (e.g., wood shavings), perlite, recycled board scraps, and water. In one embodiment, for example, the construction board comprises a combination of magnesium oxide, magnesium chloride, water, perlite, and a binding agent. In another exemplary embodiment, the construction board comprises magnesium oxide, magnesium chloride, water, perlite, a binding agent, and ground up, construction board scraps. Exemplary amounts of the various ingredients are provided below.

The construction board 10 can be used in a variety of ways during the fabrication of a structure such as a house or other type of building. Without limitation, such uses include interior wall board, structural sheathing, soffit board, exterior siding, fascia board, tile backer board, decking for countertops, radiant barrier sheathing, structural wrap, stucco wrap, window wrap, ceiling tile, and billboard backer. Because of the ingredients comprising the construction board 10, the resulting board is generally fire and water-resistant and substantially more durable than conventional gypsum wall board. Further, in at least some embodiments, the construction board 10 is free of, or at least substantially free of, any combination, or all, of the following: silicate (including magnesium silicate), natron, and cement. Without silicate, the preferred embodiment of the construction board does not have the potential for human harm attributable to silicate-based products.

By way of definition, the construction board 10 depicted in FIG. 1 has a length L, width W, and height H1. The dimensions L, W, and H1 can be varied to suit any particular needs. In at least one embodiment, L, W, and H1 are approximately 8 feet, 4 feet, an one-half inch, respectively.

Figure 2:
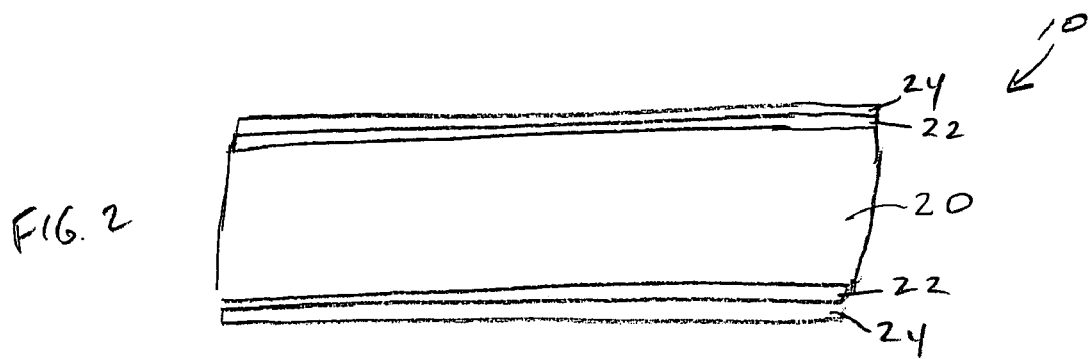
FIG. 2 shows a cross-sectional view of the construction board of FIG. 1.

FIG. 2 shows a cross-sectional view of the construction board 10. As shown, the board comprises a center portion 20 which generally comprises the composition of the various ingredients as described below. A pair of fiberglass sheets 22 is also included on opposite sides of the board 10. Further still, a pair of polyester paper sheets 24 is also included adjacent the fiberglass sheets 22. In at least some embodiments, the fiberglass sheets 22 may be sufficiently porous to permit some of the composition 20 to permeate the fiberglass sheets.

Figure 3:
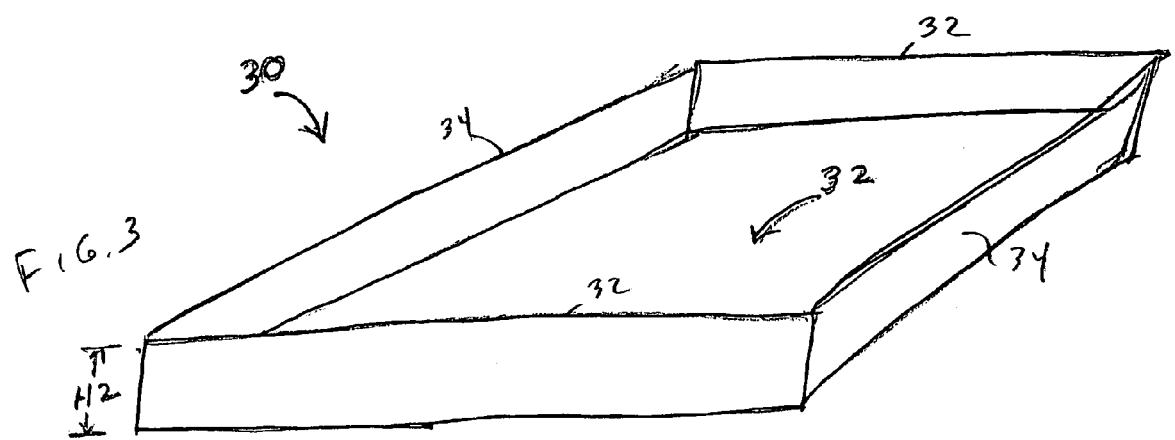
FIG. 3 shows a perspective view of a mold used in the fabrication of the construction board.
Figure 4:
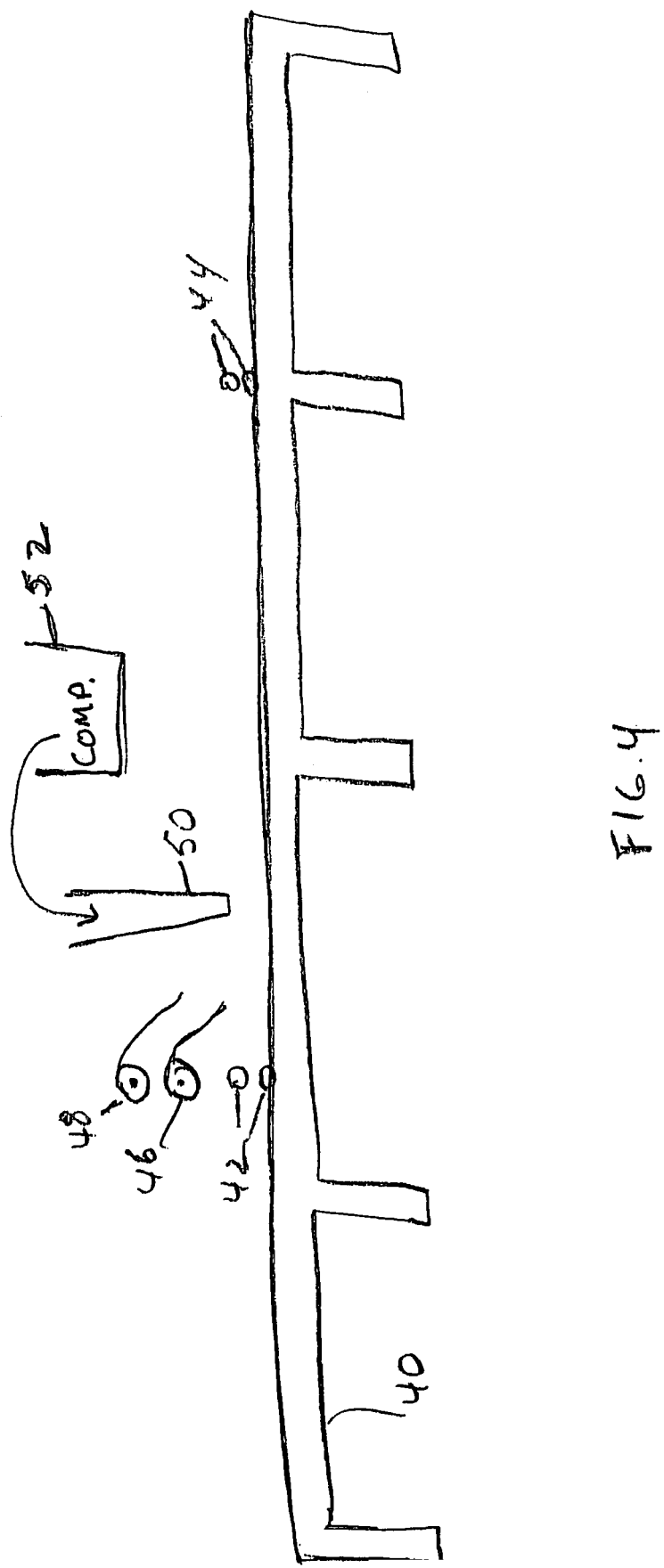
FIG. 4 shows a fabrication station at which one or more of the construction boards can be fabricated.

The following discussion describes a preferred method for fabricating the construction board 10. FIGS. 3 and 4 depict at least some of the equipment used to fabricate the construction board 10. FIG. 3 illustrates a mold 30 that is used. The mold may comprise a plastic (or other suitable material) flat sheet and, in some embodiments, may have lips while in other embodiments not have lips. The lips function to help define the thickness of the board. When mixed together, the constituent ingredients form a mixture that is viscous enough so that, in some embodiments, the lips are not needed—the mixture can be formed to any suitable thickness without the use of lips on the mold. As shown in FIG. 3, the mold has a base 32 and lips 32 and 34 that protrude up from the base 32. The length and width dimensions of the mold 30 approximate the desired dimensions of the construction board 10. The height H2 of the mold, however, may be less than the desired height H1 of the construction board.

FIG. 4 shows a production line table 40 usable to fabricate the construction board 10. The table 40 preferably is of a length longer than the desired length of the construction board. Two pairs of rollers 42 and 44 are also included between which the mold will pass as will be described below. Rolls 46 and 48 contain fiberglass and polypropylene, respectively, which are used during the fabrication of the board. The mold 30 is passed along the table 40 between the rollers as described herein. Spout 50 receives the composition from a mixing chamber 52. Through the spout 50, the composition can be poured onto the mold 30 as it passes along table 40.

In some embodiments, boards are made using ground up excess portions (e.g., scraps) from prior fabrication processes of construction boards. That is, as the boards are cut to size, the left-over scraps are ground up and reused to make future boards. In other embodiments, recycled board scraps are not used. In a preferred embodiment, the construction board 10 comprises the ingredients listed below in Table 1. The kilogram values represent sufficient materials to fabricate four boards that are each approximately 4 feet wide by 8 feet long by 12 millimeters (mm) thick. The relative proportions (in "parts") are also provided. The column labeled "without recycling" refers to the ingredients used to make the boards without reusing left-over board scraps from prior fabrication processes. The column labeled "with recycling" refers to the ingredients used to make the boards while reusing left-over board scraps from prior fabrication processes.

TABLE 1

| INGREDIENTS | Without recycling | | With Recycling | |
|---|---|---|---|---|
| | Parts by weight | Amount (Kg) | Parts by weight | Amount (Kg) |
| Magnesium oxide | 7 | 105 | 10 | 100 |
| Magnesium chloride and water mixture | 3 | 45 | 4 | 40 |
| Perlite | 1.67 | 25 | 2 | 20 |
| Binding agent | 1 | 15 | 1 | 10 |
| Recycled board scraps | N/A | N/A | 2 | 20 |

The magnesium oxide, magnesium chloride and perlite ingredients are initially in powder form. In at least some embodiments, the magnesium oxide that is used may comprise, by weight, 89.1% magnesium, 5.3% silicon, 3.9% calcium, 1% iron, 0.2% chloride, 0.2% sulfur, 0.2% cobalt, and 0.1% gallium. Preferably, the size of the magnesium oxide particles used to make the construction board are in the range from approximately 1 µm to approximately 50 µm. The magnesium chloride preferably comprises, by weight, 64.5% chloride, 23.2% magnesium, 8% sodium, 2.4% sulfur, 1.2% potassium, 0.3% bromine, 0.2% aluminum, 0.1% iron, and 0.1% calcium. Preferably, the size of the magnesium chloride particles used to make the construction board are in the range from approximately 0.5 µm to approximately 3 µm. The perlite preferably comprises, by volume, 64% silicon, 14.2% potassium, 10.9% aluminum, 3.8% sodium, 3.2% iron, 2.5% calcium, 0.5% arsenic, 0.3% titanium, 0.3% manganese, 0.1% rubidium, and 0.1% zirconium. Preferably, the size of the perlite particles used to make the construction board are in the range from approximately 2 µm to approximately 6 µm. The binding agent functions to bind the composition together and may comprise wood shavings although binding agents other than wood shavings may be used in this regard as desired.

Figure 5:
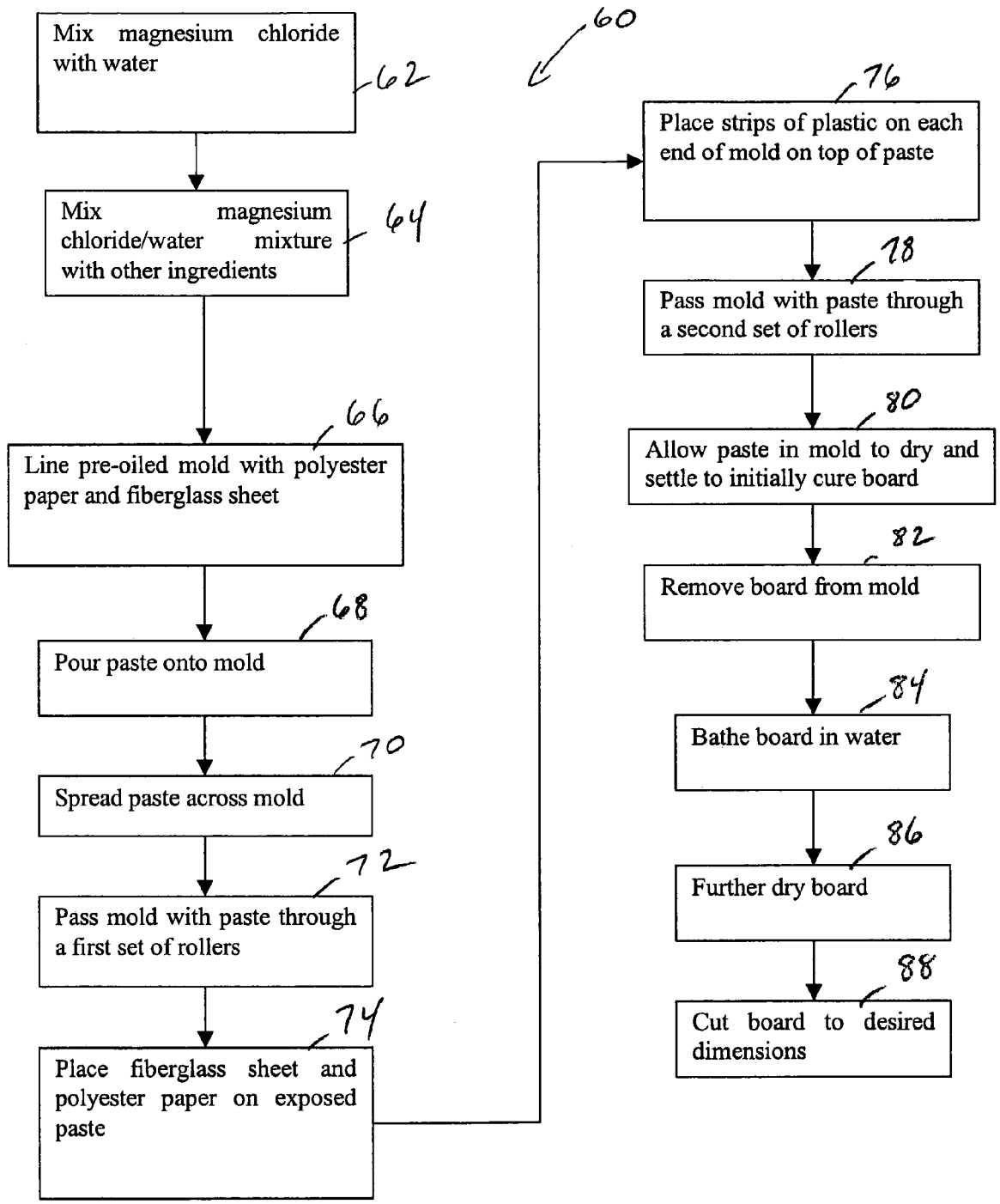
FIG. 5 shows a preferred method of fabricating the construction board.

FIG. 5 illustrates a method 60 for fabricating the construction board 10 in accordance with a preferred embodiment of the invention. Method 60 includes a plurality of actions 62-88, which will be described below. The order of least some of the actions of method 60 can be varied from that shown and at least some of the actions may be performed sequentially or concurrently. The amounts of each ingredient described in FIG. 5 is in accordance with the amounts in Table 1 and depends on whether recycled ground up board scraps are used.

At 62, the method includes mixing magnesium chloride with water in a mixing chamber (which may be different from mixing chamber 52 in FIG. 4) to form a solution. Tap water may be used. For every 10 kg of magnesium chloride, approximately 0.9 cubic meters of water is used to form the solution. The magnesium chloride and water solution is stirred periodically over a period of time, such as 8 hours, to let any impurities rise to the surface. Such impurities preferably are removed.

At 64, the magnesium chloride/water solution is mixed in mixing chamber 52 with the remaining ingredients listed in Table 1, which may or may not include recycled board material as noted above, to form a paste. If wood shavings are used as the binding agent, the wood shavings preferably are filtered through a sieve to trap large pieces of wood and other non-timber impurities. The resulting paste is mixed for enough time (e.g., a few minutes) until the mixture achieves a cake mix-like consistency.

Action 66 comprises lining a pre-oiled mold (e.g., mold 30) with a polyester paper sheet and a fiberglass sheet on top of the polyester paper. This action can be performed by placing the pre-oiled mold 30 on table 40 and unrolling a suitable length of each of rolls 46 and 48 on to the mold. The mold 30 may be pre-oiled with any suitable oil or other material that reduces the propensity for the composition to stick to the mold. An example of a suitable oil for this purpose comprises 1 part engine oil to 10 parts water.

After the paste has settled in the mixing chamber 52, the paste is then poured onto the mold (action 68). The paste will be relatively thick and will thus remain in a pile on the mold 30 to a height that may be greater than the height H2 of the mold. At 70, the paste is spread across the mold 30 in accordance with any suitable technique such as by using a wooden or plastic board to push the paste around to spread it out as desired. At 72, the mold 30 with paste is then passed through a first pair of rollers 42. The spacing of the rollers in roller pair 42 is such that the paste is spread around on the mold to roughly approximate the desired height H1 for the resulting construction. This action may result in some of the paste spilling over the edges of the mold. Once the mold 30 has passed through the first pair of rollers 42, at 74 another sheet of fiberglass is unrolled and placed on the exposed surface of the paste in the mold. Further, another sheet of polyester paper is unrolled onto the fiberglass sheet.

Figure 6:
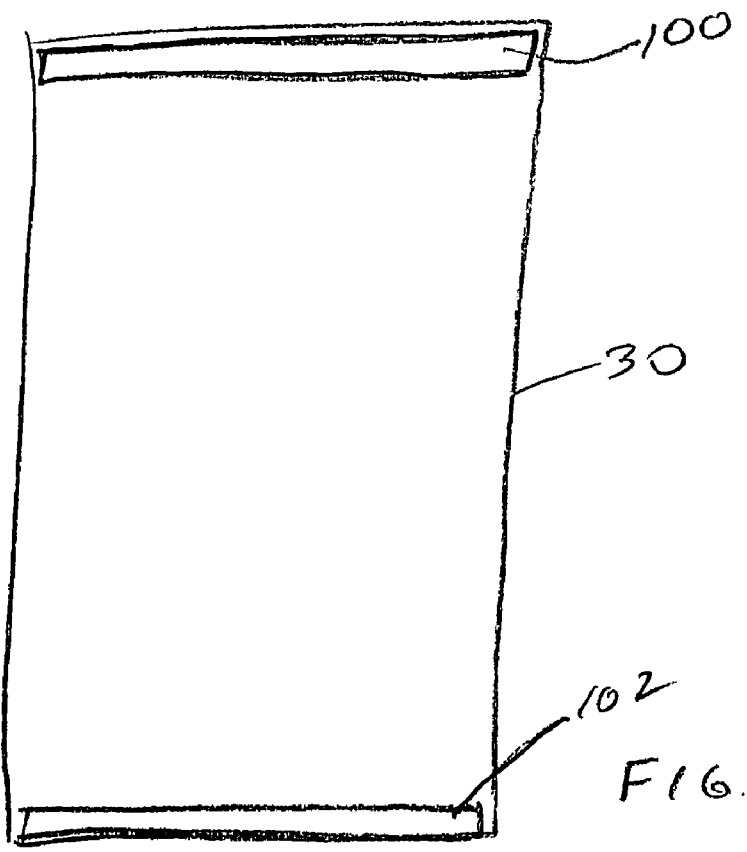
FIG. 6 illustrates an interim step during the fabrication of the construction board in which plastic strips are laid on opposite ends of the board.

At 76, a pair of plastic strips are placed on opposite ends of the mold on top of the paste as shown in FIG. 6. FIG. 6 shows a top view of the mold 30 with paste therein. A pair of plastic strips 100 are placed on the paste in the mold at opposite ends of the mold as shown. The plastic strips 100 generally run the width of the mold and function to maintain the end edges of the paste generally even prior to passing the mold through a second set of rollers. Referring again to FIG. 5, the mold 30 is then passed through a second set of rollers 44 (78). Rollers 44 preferably are spaced closer together than rollers 42 and are spaced apart at a distance that is equal to, or approximately equal to, the desired thickness H1 of the resulting construction board 10. After the mold is passed through the second pair of rollers 44, the paste in the mold has a thickness that is at least approximately the desired thickness of the construction board. The plastic strips 100 can then be removed.

Both pairs of rollers 42 and 44 are preferably constantly moisturized to minimize or prevent the composition from sticking to the rollers. For example, water can be sprayed on the rollers for this purpose.

The paste is permitted to dry and settle to initially cure the board at 80. The board is dried preferably for approximately 8 hours, although this time can be varied depending on the ambient temperature and humidity. At 82, the board is removed from the mold. At 84, the board is bathed in water (e.g., a concrete tank) for approximately 8 to 12 hours depending on the thickness of the board. Thicker boards are bathed for a longer periods of time than thinner boards. The bathing process is a post-curing "cooling" down process that also allows the materials in the composition to further bond and for impurities in the board to be removed. After the bath, the board is further dried (86). This final drying action can be performed by placing the board outside in preferably sunny weather for approximately 2 to 3 days. This final drying step serves to cause all, or substantially all, water to evaporate from the board. Finally, the board is trim cut to the desired dimensions (88). The board scraps removed during the trimming process can be ground to a power form and used as one of the constituent ingredients as noted above.

Figure 7:
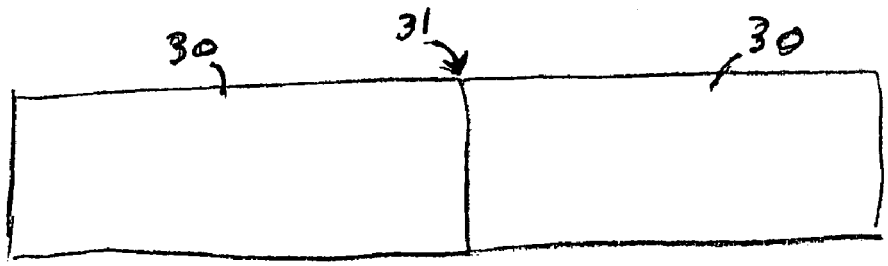
FIG. 7 illustrates two molds placed end-to-end to fabricate multiple boards simultaneously.

If desired, multiple boards may be fabricated on table 40 generally simultaneously. To fabricate multiple boards concurrently, multiple molds are used and placed end-to-end as illustrated in FIG. 7. Then, method 100 of FIG. 5 can be performed by pouring the composition across both molds in act 68. After placing the fiberglass and polypropylene sheets on the exposed paste across both molds, the paste is cut along seam 31 to separate the two molds. Then, actions 76-88 can be performed on each separate mold albeit generally simultaneously.

Figure 8:
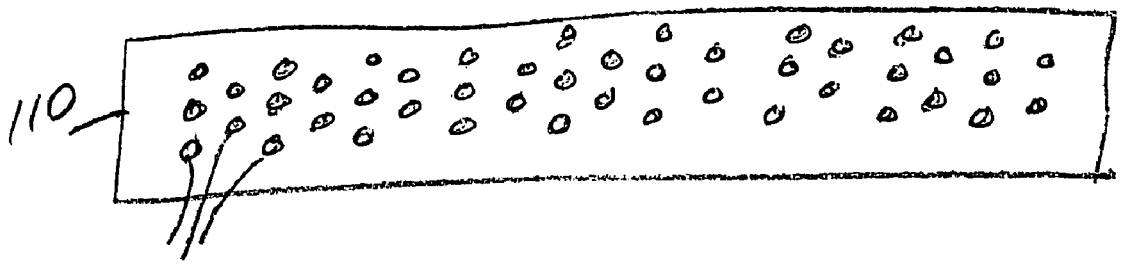
FIG. 8 shows a preferred embodiment of the construction board fabricated to be used as fascia board.

As noted above, multiple uses are possible for the construction board made from the composition described herein. By way of example, FIG. 8 shows a board 110 formed into a board suitable for use as a soffit board on a house. Holes 112 are drilled into the board 110 for airflow. A suitable texture material can be applied to the board to make the board aesthetically suitable as ceiling tile and the like.

The construction board 10 of the preferred embodiment can be cut with any conventional saw suitable for cutting wood and can be nailed in place using wood nails.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A construction board made from a molded composition, said molded composition comprising:
   magnesium oxide;
   magnesium chloride; and
   perlite;
   wherein said molded composition forms said construction board; and
   wherein said construction board also comprises fiberglass sheets on opposite sides of said molded composition.

2. The construction board of claim 1 wherein said molded composition further comprises a binding agent.

3. The construction board of claim 2 wherein the binding agent comprises wood shavings.

4. The construction board of claim 1 wherein said molded composition further comprises ground up construction board.

5. The construction board of claim 1 wherein said molded composition comprises approximately 7 parts magnesium oxide, approximately 3 parts magnesium chloride dissolved in/water, and approximately 1.67 parts perlite.

6. The construction board of claim 5 further comprising 1 part binding agent.

7. The construction board of claim 6 wherein the binding agent comprises wood shavings.

8. The construction board of claim 1 wherein said molded composition comprises approximately 10 parts magnesium oxide, approximately 4 parts magnesium chloride/water solution, and approximately 2 parts perlite.

9. The construction board of claim 8 wherein said molded composition further comprises approximately 2 parts ground up construction board.

10. The construction board of claim 9 wherein said molded composition further comprises approximately 1 part binding agent.

11. The construction board of claim 1 further comprising a polyester paper sheet on opposite sides of said construction board adjacent said fiberglass sheets.

12. The construction board of claim 1 wherein said construction board is a board usable as a facia board having holes for airflow.

13. The construction board of claim 1 wherein said construction board is a board usable as an interior wall board, structural sheathing, soffit board, exterior siding, fascia board, tile backer board, decking for countertops, radiant barrier sheathing, structural wrap, stucco wrap, window wrap, ceiling tile, and billboard backer.

14. The construction board of claim 1, wherein the construction board has a thickness of one half inch.

15. The construction board of claim 1, wherein the construction board is substantially free of silicate.

* * * * *